Patented Aug. 8, 1939

2,169,162

UNITED STATES PATENT OFFICE 2,169,162

AZO DYESTUFFS AND PROCESS FOR THE MANUFACTURE THEREOF

Pierre Petitcolas, Rouen, France, assignor to Compagnie Nationale de Matieres Colorantes et Manufactures de Produits Chimiques du Nord Reunies, Etablissements Kuhlman, Paris, France, a corporation of France No Drawing. Application July 22, 1938, Serial No. 220,802. In France September 4, 1937

3 Claims. (Cl. 260—193)

This invention relates to new azo-dyestuffs and processes for the manufacture thereof.

It is known that 2-nitrobenzene-1,4-disulphonic acid is obtained not directly by sulphonation but by heating 1-chloro-2-nitrobenzene-4-sulphonic acid with sodium sulphite in an aqueous medium.

In the same way up to the present it has not been possible to carry out industrially the preparation of the disulphochloride of this acid; the action of chlorsulphonic acid or phosphorus pentachloride has produced in fact 1-chloro-2-nitrobenzene-4-sulphochloride.

The production of derivatives of 2-nitro-benbene-1,4-disulphonic acid is, therefore, only possible by indirect methods.

In particular for the preparation of products of the type:

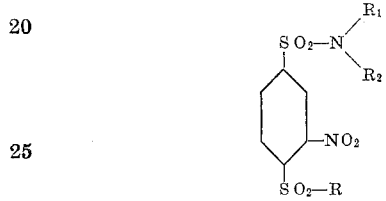

up to the present one of the following methods has been used:

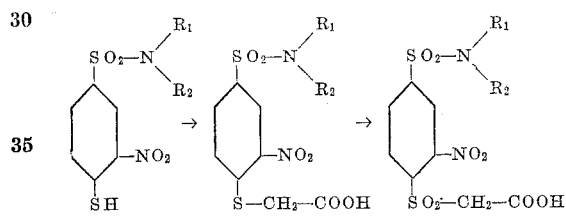

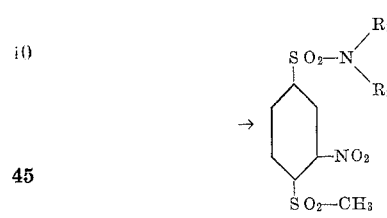

or

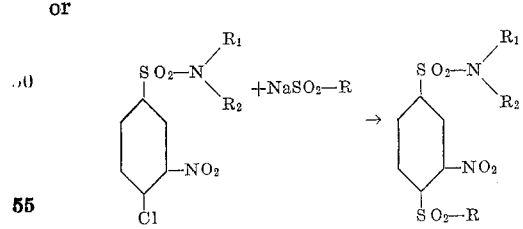

However, these two processes only permit of producing one particular class of derivatives of 2-nitrobenzene-1,4-disulphonic acid, those derived from sulphones nitrated in the 2-position.

Now, if the sulphonamides of the general formula:

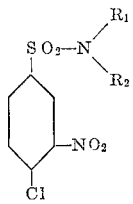

are considered in which $R_1$ and $R_2$ represent atoms of hydrogen or alkyl, aralkyl, aryl or cycloalkyl groups, it is possible to condense them with the disulphides of alkali metals for example in an alcoholic medium with sodium disulphide, in order to obtain disulphides corresponding to the formula:

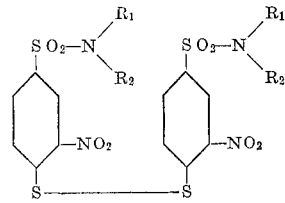

These disulphides when subjected to the action of chlorine in an 85–90% acetic acid medium give the sulphochlorides of the formula:

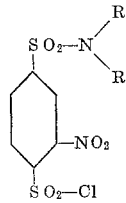

These sulphochlorides can be condensed with ammonia or primary or secondary amines in such a manner as to obtain the products of the formula:

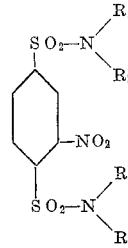

in which $R_3$ and $R_4$ have the same significance as $R_1$ and $R_2$, which products, by reduction, give under particularly interesting conditions of yield and purity the amines

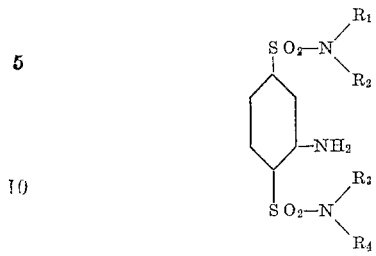

The present invention concerns the production of new azo-dyestuffs by diazotization of the amines of the above general formula and coupling of the azo-derivatives thus obtained with the customary coupling components. According to the coupling components selected it is possible to obtain dyestuffs utilisable for the most varied purposes.

With the naphthol-sulphonic, naphthylamine-sulphonic and amino-naphthol-sulphonic acids, amino-naphthol-sulphonic acids substituted on the nitrogen and aryl-pyrazolone sulphonic acids there are obtained for example dyestuffs for wool. With coupling components of substantive character such as the arylides of the ortho-hydroxy-carboxylic acids and of the acyl-acetic acids it is possible to obtain in substance or on the fibre insoluble dyestuffs of good fastness properties. The preparation of such dyestuffs on the fibre can be carried out by one of the customary methods with or without the intermediate production of diazo-amino-derivatives, nitrosamines, Schiff bases, diazo-sulphonates and so on. The same dyestuffs, prepared in substance, can be utilised for the coloration of varnishes, lacquers, latex, paper, plastic materials, artificial silks in the mass, rubber and so on.

The following examples illustrate the invention without limiting the same thereto:

Example 1

700 grams of 1-chloro-2-nitro-4-diethylsulphonamidobenzene are dissolved at 70–75° C. in 1800 ccs. of ethyl alcohol. There is caused to flow in with brisk stirring in order to avoid separation into two layers, a hot solution prepared from 315 grams of $Na_2S,9H_2O$, 43 grams of sulphur and 1000 ccs. of alcohol. It may be necessary to cool in the course of the introduction. The disulphide precipitates abundantly. The whole is allowed to cool with stirring and then the crystals are filtered and are washed with alcohol and then with water.

Weight after drying_____grams__ 650
Melting point_____° C__ 198
Yield _____percent__ 90

After recrystallisation from glacial acetic acid, the 4,4'-(diethylsulphonamido)-2,2'-dinitro-1,1'-diphenyl-disulphide is produced in the form of large greenish yellow prisms.

Melting point 190° C.

650 grams of the above disulphide are pasted in 2500 ccs. of glacial acetic acid and 300 ccs. of water. A current of chlorine is caused to pass through first rapidly and then more slowly while energetically stirring the mass, the temperature being prevented from exceeding 35° C. At the end of some hours the disulphide has entered completely into solution. Chlorine is continuously passed until a test portion, poured in ice, melts at 98–100° C. This results at the end of about 10 hours. The whole is poured on ice and the crystals filtered and washed with cold water.

Dry weight_____grams__ 740
Melting point_____° C__ 98–100
Weight in paste_____grams__ 1100

After recrystallisation from acetic acid the 1-diethylsulphonamido-3-nitrobenzene-4-sulphochloride is formed in very large slightly greenish yellow prisms. Melting point 102° C.

200 grams of the paste of sulphochloride are brought into suspension in 300 ccs. of water. There are added with stirring 400 ccs. of 30% diethylamine solution and the whole is heated for one hour to boiling with good agitation. The crude product after filtration is recrystallised from alcohol. It is produced in the form of fine yellowish crystals melting at 118° C. Dry weight 100 grs.

After reduction in dilute acetic acid of 60% strength with zinc dust there are isolated with a yield of 85% magnificent crystals which are perfectly colourless and the melting point of which is 172° C.

This new base has for its formula:

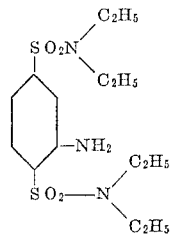

| Analysis | Calculated | Found |
|---|---|---|
| C%_____ | 46.28 | 46.42 |
| H%_____ | 6.88 | 6.63 |
| N%_____ | 11.6 | 12.15 |
| S%_____ | 17.63 | 17.14 |

In the same manner it is possible to prepare for example by replacing the diethylamine by dimethylamine the 1-diethylsulphonamido-3-nitro-4-dimethylsulphonamido-benzene the melting point of which after crystallisation from alcohol is 120° C. This body is produced in the form of fine yellowish crystals which on reduction give the 1-diethylsulphonamido-3-amino-4-dimethylsulphonamido-benzene, colourless crystals the melting point of which is 184° C.

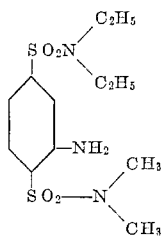

With the 1-diethylsulphonamido-3-nitro-4-benzene-sulphochloride and monoethylaniline there is produced the 1-diethylsulphonamido-3-nitro-4-ethylphenylsulphonamido-benzene which is produced in the form of almost colourless crystals. Melting point 140° C. after crystallisation from glacial acetic acid.

By reduction there are obtained magnificent colourless prisms. Melting point 133° C. after crystallisation from alcohol.

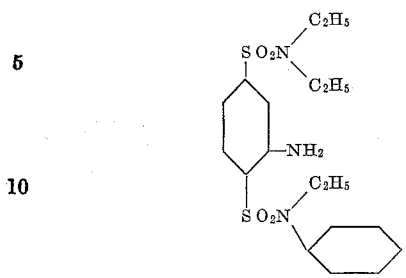

By replacing the ethylaniline by methylaniline there is obtained the 1-diethylsulphonamido-3-nitro-4-methyl-phenyl-sulphonamido - benzene, melting point after crystallisation from acetic acid 130° C., which is produced in the form of fine needles agglomerated in slightly greenish tufts which by reduction give large colourless prisms of 1-diethyl-sulphonamido-3-amino-4-methylphenyl-sulphonamido-benzene. Melting point 137° C.

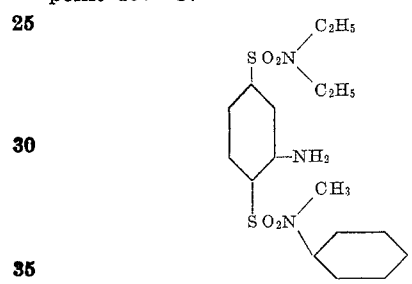

*Example 2*

(a) 800 grams of 1-chloro-2-nitro-4-dimethylsulphonamido-benzene are dissolved at 75° C. in 2500 ccs. of ethyl alcohol. A boiling emulsion is made with 380 grams of $Na_2S,9H_2O$, 51 grams of sulphur and 800 ccs. of alcohol which is prevented from separating into two layers before pouring gradually with energetic stirring into the alcoholic solution of the sulphonamide. The disulphide precipitates as a voluminous mass which is difficult to stir. The whole is heated for one hour longer at 70–80° C. and after cooling the product is washed first with alcohol and then with much water.

Dry weight 780 grs.

Melting point 275–280° C. with decomposition or more exactly 280° C. with decomposition, after recrystallisation from acetic acid, which solvent dissolves it fairly difficultly even on boiling.

The dilute alcoholic solution, after decolorisation with carboraffin, deposits, after acidification with acetic acid, a small quantity, 50 grs. after drying, of 1-dimethyl-sulphonamido-3-nitro-4-thiophenol which melts at 162–165° C. with oxidation on the mercury bath with re-formation of the disulphide which is produced in the form of large yellowish prisms after recrystallisation from acetic acid.

(b) 500 grs. of 4, 4'-di-(dimethylsulphonamido)-2, 2'-dinitro-1, 1'-dipenhyl-disulphide are brought into suspension in 2500 ccs. of glacial acetic acid and 300 ccs. of water. A rapid current of chlorine is passed through until the temperature rises to 30–55° C. This temperature is maintained by regulating the delivery of chlorine. The disulphide gradually passes into solution. The passage of chlorine is continued until a test portion diluted and filtered gives a product which melts at 147–148° C. and is entirely soluble in dilute sodium carbonate. The whole is left over night while allowing to cool, then poured on ice, filtered and washed.

Dry weight 545 grs., melting point 149–150° C. Yield about 87%.

After recrystallisation from acetic acid the 1-dimethyl-sulphonamido-3-nitrobenzene - 4 - sulphochloride is produced in the form of colourless needles. Melting point 151° C.

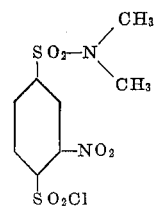

(c) 140 grs. of crude 1-dimethylsulphonamido-3-nitrobenzene-4-sulphochloride, melting point 149–150° C., are dissolved in 500 ccs. of chlorobenzene. There are introduced with stirring 70 grs. of 95% diethylamine. The temperature rises to 65° C. After 10 minutes stirring the whole is cooled and distilled in steam in the presence of 100 ccs. of concentrated HCl. The crystals are filtered and dried; dry weight 160 grs. melting point 128–132° C.

After recrystallisation from acetic acid the compound gives fine slightly yellowish plates. Melting point 134° C.

By reduction with 50% acetic acid and zinc there is obtained 1-dimethylsulphonamido-3-amine-4-diethyl-sulphonamido benzene which after crystallisation from alcohol is produced in fine colourless needles. Melting point 174° C.

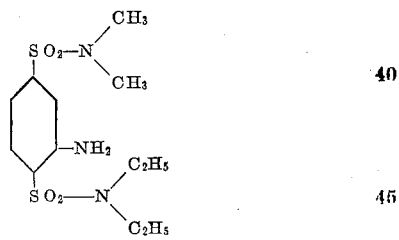

By replacing the diethylamine by dimethylamine there is produced with the same ease the 1-dimethylsulphonamido-3- nitro-4-dimethylsulphonamido benzene which melts after crystallisation from alcohol at 184° C. and, by reduction, gives the 1-dimethylsulphonamido-3-amino-4-dimethylsulphonamido-benzene which is produced in the form of colourless needles melting at 197° C.

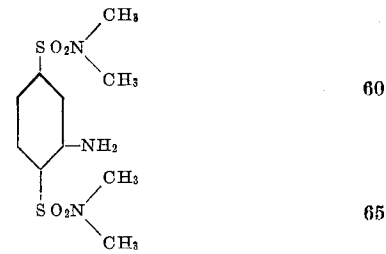

With methylaniline and the same sulphochloride there is produced the 1-dimethylsulphonamido - 3 - nitro- 4 - methylphenyl-sulphonamido-benzene in slightly yellowish crystals melting at 165° C. after crystallisation from acetic acid and which by reduction gives 1-dimethylsulphonamido-3-amino-4-methyl-phenyl-sulphonamido-benzene which is produced in the form of colourless

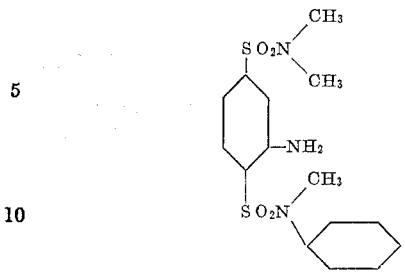

Example 3

300 grs. of 1-chloro-2-nitro-4-methylphenyl-sulphonamido-benzene are dissolved at 70° C. in 2000 ccs. of ethyl alcohol. There is prepared as indicated above a solution of 127 grs. of Na₂S,9H₂O and 18 grs. of sulphur in 500 ccs. of ethyl alcohol. The solution of disulphide (which on standing separates into two layers) is caused to flow gradually into the solution of sulphonamido. The reaction is fairly violent. After complete introduction the whole is heated again for one hour to 75° C. The whole is allowed to cool with stirring and the crystals are filtered and washed, first with alcohol then with water.

Weight after drying 250 grs.

Melting point 206–207° C.

After recrystallisation from acetic acid there are obtained voluminous yellowish crystals. Melting point 208° C.

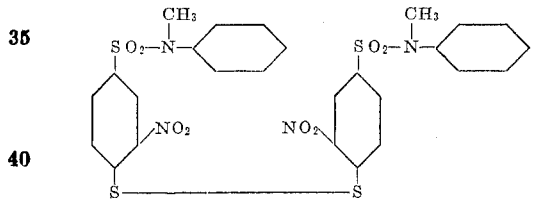

250 grs. of 4,4'-di-(methylphenylsulphonamido)-2,2'-dinitro-1,1'-diphenyl-disulphide are pasted in 200 ccs. of 90% acetic acid and treated with a current of chlorine as indicated above, without exceeding a temperature of 30° C. The sulphochloride recrystallized from acetic acid forms large colourless prisms. Melting point 147° C.

By condensation with diethylamine according to the process already indicated there is obtained the 1-methyl-phenyl-sulphonamido-3-nitro-4-diethylsulphonamido-benzene which after recrystallisation from acetic acid gives fine slightly yellowish needles. Melting point 150° C.

By reduction in the customary manner there are isolated large colourless prisms. Melting point after crystallisation from alcohol 157° C. The alcoholic solution exhibits a magnificent blue fluorescence.

Example 4

The majority of these bases give very dissociated hydrochlorides which accordingly are difficultly diazotised. It may be necessary to carry out the diazotisation in a solvent medium, for example acetic acid.

30 grams of 1,4-di-(diethylsulphonamido)-3-amino-benzene are pasted with 100 ccs. of glacial acetic acid and 50 ccs. of concentrated HCl. After external cooling the whole is diazotised with 15 ccs. of 50% sodium nitrite solution then 20 grs. of zinc chloride are added dissolved in 50 ccs. of water and 15 ccs. of HCl.

The diazo compound is then precipitated with 500 ccs of salt water of 24° Bé. There are obtained brilliant slightly yellowish plates which are filtered and washed with salt water.

Dry weight 50 grs. which are mixed intimately with 90 grs. of anhydrous aluminium sulphate.

The slightly yellowish powder obtained is easily soluble in water and the diazo solution obtained gives on skeins of cotton, impregnated with for example arylide of β-hydroxy-naphthoic acid, a whole range of yellowish orange shades of good fastness properties.

It is likewise possible in many cases to isolate the diazonium chloride without stabilising.

20 grs. of 1-diethyl-sulphonamido-3-amino-4-methyl-phenyl-sulphonamido-benzene are pasted in 150 ccs. of glacial acetic acid and 100 ccs. of concentrated HCl. After external cooling the whole is diazotised with 15 ccs. of 50% sodium nitrite diluted with its own volume of water. After 10 minutes stirring the whole is diluted with 600 ccs. of salt water of 24° Bé. The yellow needles of the diazonium chloride are filtered, washed with salt water and dried at a low temperature.

Dry weight 35 grs. The product is mixed with 75 grs. of anhydrous aluminium sulphate whereby a yellow powder is obtained fairly easily soluble in water.

There can be used as coupling components the arylides of β-hydroxy-naphthoic acid, of hydroxycarbazole carboxylic acids, hydroxyanthracene carboxylic acids and so on, the acyl acetyl derivatives, the pyrazolones and so on. The dyestuffs can be produced on the fibre or in substance.

The following table indicates the shades obtained by coupling on the fibre the diazo derivatives of different amines according to the invention with different coupling components:

| Diazo-component | Coupling component | Shade on cotton |
|---|---|---|
| 2-diethylsulphonamido-5-methylphenylsulphonamido-amino benzene | Diacetoacetyl-o-tolidine | Yellow. |
| | 2.3-hydroxy naphthoic acid— | |
| Do | Anilide | Orange. |
| Do | m-Nitranilide | Reddish orange. |
| Do | β-Naphthylamide | Do. |
| Do | 5-chloro-o-toluidide | Orange. |
| Do | p-Anisidide | Do. |
| Do | o-Toluidide | Do. |
| Do | α-Naphthylamide | Reddish orange. |
| Do | o-Anisidide | Orange. |
| Do | p-Chloro-o-anisidide | Do. |
| Do | 2.4-dimethoxy-5-chloroanilide | Brownish orange. |
| 2-dimethylsulphonamido-5-diethylsulphonamido-aminobenzene | Diacetoacetyl-o-tolidine | Yellow. |
| | 2.3-hydroxy naphthoic acid— | |
| Do | Anilide | Golden orange. |
| Do | m-Nitranilide | Orange. |
| Do | β-Naphthylamide | Do. |
| Do | 5-chloro-o-toluidide | Do. |
| Do | p-Anisidide | Do. |
| Do | o-Toluidide | Do. |
| Do | α-Naphthylamide | Brownish red. |
| Do | o-Anisidide | Orange red. |
| Do | p-Chloro-o-anisidide | Orange. |
| Do | 2.4-dimethoxy-5-chloroanilide | Yellowish brown. |

| Diazo-component | Coupling component | Shade on cotton |
|---|---|---|
| 2-dimethylsulphonamido-5-methylphenylsulphonamido-amino benzene | Diacetoacetyl-o-tolidine | Yellow. |
| Do | 2.3-hydroxy naphthoic acid— | |
| Do | Anilide | Orange. |
| Do | m-Nitranilide | Do. |
| Do | β-Naphthylamide | Reddish orange. |
| Do | 5-chloro-o-toluidide | Orange. |
| Do | p-Anisidide | Do. |
| Do | o-Toluidide | Do. |
| Do | α-Naphthylamide | Reddish orange. |
| Do | o-Anisidide | Orange. |
| Do | p-Chloro-o-anisidide | Do. |
| Do | 2.4-dimethoxy-5-chloro-anilide | Brownish orange. |
| 2.5-di-(dimethylsulphonamido)-amino benzene | Diacetoacetyl-o-tolidine | Yellow. |
| Do | 2.3-hydroxy naphthoic acid— | |
| Do | Anilide | Golden orange. |
| Do | m-Nitranilide | Orange. |
| Do | β-Naphthylamide | Reddish orange. |
| Do | 5-chloro-o-toluidide | Orange. |
| Do | p-Anisidide | Brownish orange. |
| Do | o-Toluidide | Reddish orange. |
| Do | α-naphthylamide | Orange. |
| Do | o-Anisidide | Orange red. |
| Do | p-Chloro-o-anisidide | Orange scarlet. |
| Do | 2.4-dimethoxy-5-chloro-anilide | Orange brown. |
| 2-ethylphenylsulphonamido-5-diethylsulphonamido-amino benzene | Diacetoacetyl-o-tolidine | Yellow. |
| Do | 2.3-hydroxy naphthoic acid— | |
| Do | Anilide | Orange. |
| Do | m-Nitranilide | Do. |
| Do | β-Naphthylamide | Do. |
| Do | 5-chloro-o-toluidide | Do. |
| Do | p-Anisidide | Do. |
| Do | o-Toluidide | Do. |
| Do | α-Naphthylamide | Brownish orange. |
| Do | o-Anisidide | Orange. |
| Do | p-Chloro-o-anisidide | Do. |
| Do | 2.4-dimethoxy-5-chloro-anilide | Brownish orange. |
| 2.5-di-(diethylsulphonamido)-amino benzene | Diacetoacetyl-o-tolidine | Yellow. |
| Do | 2.3-hydroxy naphthoic acid— | |
| Do | Anilide | Orange. |
| Do | m-Nitranilide | Do. |
| Do | β-Naphthylamide | Do. |
| Do | 5-chloro-o-toluidide | Do. |
| Do | p-Anisidide | Do. |
| Do | o-Toluidide | Do. |
| Do | α-Naphthylamide | Red. |
| Do | o-Anisidide | Orange. |
| Do | p-Chloro-o-anisidide | Do. |
| Do | 2.4-dimethoxy-5-chloro-anilide | Brown. |

What I claim is:

1. The azo-dyestuffs of the following probable general formula:

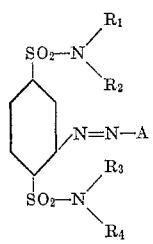

in which $R_1$, $R_2$, $R_3$, $R_4$ are members of the group consisting in the hydrogen atom, alkyl, aralkyl, aryl and cycloalkyl groups and A is the residue of a coupling component of the group consisting of the arylides of ortho-hydroxy-carboxylic acids and of acyl acetic acids.

2. Process for the manufacture of azo-dyestuffs which consists in coupling in substance a diazo derivative of an amine having following general formula:

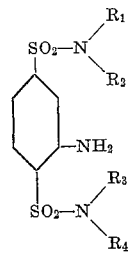

wherein $R_1$, $R_2$, $R_3$, $R_4$ stand for members of the group consisting of hydrogen, alkyl, aralkyl, aryl and cycloalkyl groups, with a member of the group consisting of the arylides of orthohydroxy carboxylic acids and acylacetic acids.

3. Process for the manufacture of azo-dyestuffs which consists in coupling on the fiber a diazo derivative of an amine having following general formula:

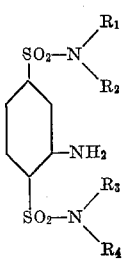

wherein $R_1$, $R_2$, $R_3$, $R_4$ stand for members of the group consisting of hydrogen, alkyl, aralkyl, aryl and cycloalkyl groups, with a member of the group consisting of the arylides of orthohydroxy carboxylic acids and acylacetic acids.

PIERRE PETITCOLAS.